United States Patent Office 3,008,229
Patented Nov. 14, 1961

3,008,229
PROCESS FOR APPLYING A PROTECTIVE COATING FOR SALT BATH BRAZING
Allen C. Francisco, Chesterland, and Charles A. Gyorgak, Cleveland, Ohio, assignors, by mesne assignments, to the United States of America as represented by the National Aeronautics and Space Administration
No Drawing. Original application Nov. 12, 1954, Ser. No. 468,590, now Patent No. 2,812,275, dated Nov. 5, 1957. Divided and this application Sept. 27, 1957, Ser. No. 686,796
1 Claim. (Cl. 29—488)
(Granted under Title 35, U.S. Code (1952), sec. 266)

The invention described herein may be manufactured and used by or for the Government of the United States of America for governmental purposes without the payment of any royalties thereon or therefor.

This invention relates to salt bath brazing with special application to a protective coating for the brazing material.

In salt bath brazing, metals are joined by fusion of the cementing metals or alloys in a salt bath. Usually, the cement or solder is applied as a paste, powder suspension or preform to the parts to be joined, and when placed in the molten salt bath, in the case of a bonded powder, the binder is burned off at such a fast rate that the braze material is often dislodged. Also, during the period between the burn-out of the binder and the formation of the molten phase of the braze material the movement of the dense molten salt erodes the material. In the case of solid preforms, the molten salt may remove the brazing material at the temperature point at which it becomes molten but before it can wet the assembly, and flow. The result of these deficiencies in the brazing action will, of course, result in faulty joining of the metal parts.

Generally, this invention consists in applying to the braze material, prior to the brazing step, a coating of protective substance of such texture and properties as to prevent injury to the braze material during the period after insertion of the work in the salt bath and prior to melting and free flow on the surfaces to be joined.

The coating found effective as a protective agent consists of the following substances:

| Substance | Parts by Weight | Percentage |
|---|---|---|
| Graphite | 100 | 90.1 |
| Enameler's clay | 10 | 9.0 |
| Algin binder | 1 | 0.9 |

The specified clay and binder are given as examples, any of the clays or binders common to the ceramic and allied arts being usable. For example, bentonite and kaolin may be used for enameler's clay and, in place of the alginate binders, carbowax, gum arabic and tragacanth may be used. Enameler's clays are high grade, washed, plastic fire clays and frequently consist of blends of fine grained plastic clays (ball clays) with relatively fine grained china clays or kaolin, and having the mineral composition $Al_2O_3 \cdot 2SiO_2$ with varying amounts of water of hydration together with blends of these minerals. Because of the fine grained structure the clay particles mix readily with the particles of graphite. Carbowax is a polyethelene glycol having the general formula

with a molecular weight exceeding 1000.

While the proportions of material as above indicated have been found particularly usable and effective, variation may be made dependent on the desired strength of coating after firing. Satisfactory results are obtainable within the following limits:

| Substance: | Percentage |
|---|---|
| Graphite | 70–92 |
| Clay | 25–7.5 |
| Binder | 5–0.5 |

In use, the coating substances are thoroughly mixed with water, the amount of water depending on whether the coating is to be applied as a paste, as a deposition from a bath or as a spray. The mixture is then applied to the braze material, which previously has been placed at the joint, either as a powder paste or preform. The coating is then dried to remove all moisture, and the unit is then subjected to the dipping step in the molten salt bath. In this step, the coating acts as a sheath to keep the braze material intact during the burn out of the braze binder material, since otherwise, after the braze binder has been burned out and before the braze substance has melted and wetted the assembly, the braze material will be heavily eroded by the molten salt, producing faulty joints. On completion of the brazing, the assembly is removed from the bath and cooled, any salt and coating remaining on the surfaces being removed by washing.

It is important to note that through use of the coating as described it is not necessary to restrict the braze material to preforms in the salt bath procedure, this being particularly advantageous in short run brazing or in the brazing of complicated shapes. It is, also, notable that for salt bath uses the coating is not detrimental there being no contamination of the salt but, on the contrary, a rectifying action, the graphite reducing any oxides in the bath to pure metal. It is important to note also that the component coating substances are mixed together simultaneously so that the binder coats all particles of graphite and bodying material. Consequently, when applied to the braze material surface, a closely adherent coating is formed, the binder being effective both to bind the coating substances together and to the braze material surfaces.

This application is a division of our copending application Serial No. 468,590, filed November 12, 1954 which has now matured into U.S. Patent 2,812,275.

Obviously many modifications and variations of the present invention are possible in the light of the above teachings. It is therefore to be understood that within the scope of the appended claims the invention may be practiced otherwise than as specifically described.

What is claimed is:

1. A process of salt bath brazing including the steps of applying solid braze material to adjoining surfaces of the joinable articles, assembling said articles in the desired relationship, covering said applied braze material with a protective coating resistant to molten salt, said coating consisting of 70–92% graphite, 7.5–25% clay, and 0.5–5% ceramic-type bonding material, drying said coating, and dipping the assembly in a molten salt bath until the braze material has melted and joined the separate articles.

References Cited in the file of this patent
UNITED STATES PATENTS

| | | |
|---|---|---|
| 827,134 | White | July 31, 1906 |
| 1,572,921 | Gizienski | Feb. 16, 1926 |
| 1,651,891 | Hodges | Dec. 6, 1927 |
| 1,708,193 | Sherwood | Apr. 9, 1929 |
| 2,014,612 | Borton | Sept. 17, 1935 |
| 2,154,273 | Kollsman | Apr. 11, 1939 |
| 2,197,039 | Gottlieb | Apr. 16, 1940 |
| 2,275,177 | Crans | Mar. 3, 1942 |
| 2,403,109 | Miller | July 2, 1946 |
| 2,434,867 | Rudd | Jan. 20, 1948 |